Sept. 7, 1937.  C. A. ATWELL ET AL  2,092,043
PERFORATED COVER AND BAFFLE FOR RAILWAY MOTORS
Filed Nov. 28, 1936

WITNESSES:
michael Stark

INVENTORS.
Clarence A. Atwell and
Frank B. Powers.
BY
ATTORNEY

Patented Sept. 7, 1937

2,092,043

UNITED STATES PATENT OFFICE 2,092,043

PERFORATED COVER AND BAFFLE FOR RAILWAY MOTORS

Clarence A. Atwell and Frank B. Powers, Wilkinsburg, Pa., assignors to Westinghouse Electric & Manufacturing Company, East Pittsburgh, Pa., a corporation of Pennsylvania Application November 28, 1936, Serial No. 113,208

6 Claims. (Cl. 172—36)

Our invention relates particularly to the air-intake parts of railway motors which are operated in the midst of dirty air, and under strong or forced ventilation so as to obtain the maximum output in a limited space, with the result that the problem of keeping dirt and other foreign matter out of the motor is particularly difficult. In such motors, it is not always practicable to pipe clean air to the motors, and hence it is usually necessary to provide a fan member on the rotor member of the motor, said fan member being usually placed at the end of the motor opposite from the current-collecting end. If the intake-air is drawn through the lower portion of the current-collecting end of the motor, said air will come from the dirtiest area close to the ground and the tracks, resulting in an excessively large intake of dirt and other foreign matter. If the intake-air is drawn through the top of commutating end of the motor, the air will be cleaner, but there will be grave danger of dirt and other foreign matter falling indirectly onto the top of the current-collecting mechanism.

It is an object of our invention to provide a novel perforated top-cover and spaced, troughed baffle-mechanism, for satisfactorily providing for the system of ventilation in which the air is drawn in through the top of the current-collecting end of the railway motor.

Figure 1:
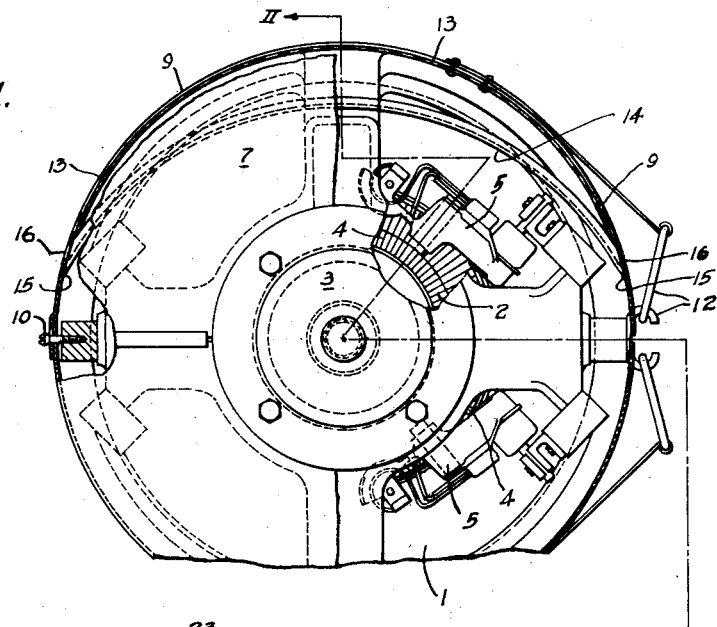
Figure 2:
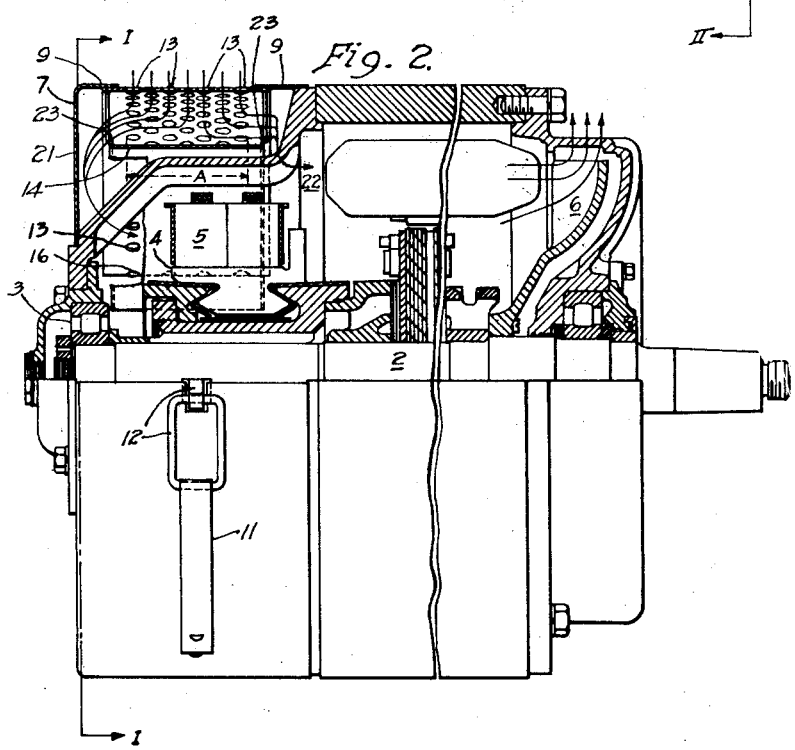

Our invention is illustrated in one preferred form of embodiment in the accompanying drawing, wherein:

Figure 1 is a partial end view of the commutator-end of a direct-current railway motor embodying our invention, said view being partly in section on the plane indicated by the line I—I in Fig. 2, and Fig. 2 is a partial longitudinal view through said motor.

The illustrated motor comprises a stator member 1 and a rotor member 2, the latter being supported by bearings 3. The left-hand end of the rotor 2, as viewed in Fig. 2, contains a current-collecting mechanism in the form of a commutator 4 and a brush-mechanism 5. The right-hand end of the rotor 2 carries a fan-member 6 for drawing air through the motor, as indicated by the arrows.

The stator member 1 is provided with an end housing 7 at the current-collecting end of the motor for substantially totally enclosing the motor at this end, except for the provision of suitable intake-openings as will subsequently be described.

It is necessary to provide for ready accessibility to the commutator 4 and the brushes 5, and to this end it is necessary to provide one or more openings in the end-housing 7. In the embodiment of our invention shown in the drawing, the entire top half of the peripheral wall of the end-housing 7 is open, so as to provide full access to the current-collecting mechanism, and this opening is closed by means of a removable cover 9 of semi-cylindrical formation, occupying the place of the entire top half of the peripheral wall of the end-housing 7. The cover 9 is removably hooked at one side 10 (Fig. 1), and detachably fastened at the other side by means of a spring 11 and latch-mechanism 12, or any equivalent removable fastening means for the cover.

According to our invention, the top portion of the cover 9 is provided with a large number of perforations 13 for providing a large number of substantially inwardly directed jets of incoming air, drawn in by the fan-member 6 at the other end of the motor. Underneath this group of perforations 13, we dispose a trough-like baffle 14 which is spaced from the perforations, for catching dirt and other foreign matter and preventing the same from falling onto the current-collecting mechanism.

It will be noted, from Fig. 1, that the baffle 14 is highest at about its central point, where it is spaced by some two inches, or other convenient distance, from the perforated top wall of the cover 9. From this highest point, the baffle is inclined downwardly on both sides, being joined to the sides of the cover 9 at the lowest point or points of the baffle, as indicated at 15. It will be noted that the walls of the cover 9 are provided with discharge-outlet means 16 at or near said junction-point 15 with the baffle, so that the dirt and other foreign matter which is collected by the baffle may be dropped out through said discharge-outlets 16. These discharge-outlets 16 may be either a separate row of outlets or they may be a continuation of the group of inlet-perforations 13. In any event, the inlet-perforations 13 will not extend below the discharge-outlets 16.

Reference to Fig. 2 will show that the group of air-inlet perforations 13 have a limited axial extent indicated by the dimension A. The trough-shaped baffle 14 has an axial width which is necessarily somewhat greater than the dimension A, so that the baffle will catch the dirt and other foreign matter discharged by the air jets which come in through the perforations 13. It will be noted, however, that the axial extent or width of the baffle 14 in Fig. 2 falls short of both the outer end-wall 21 of the end-housing 7 and the adjacent end-portion of the stator-core 22 or other internal parts of the stator-member 1, so that the incoming air may flow axially in the space between the baffle 14 and the top of the cover 9, flowing axially in both directions, both to the right and to the left, over the two side edges 23 of the trough-shaped baffle 14, as indicated by the arrows in Fig. 2.

The result of the foregoing construction is that the air enters the motor in the form of a large number of high-velocity jets coming in through the perforations 13, each jet being of only a small cross-sectional area, but the aggregate total cross-sectional area of all the jets being sufficient to admit a very copious supply of ventilating air into the motor. These jets of air immediately begin to lose velocity, in the space between the baffle and the top of the cover, thus tending to deposit their entrained dirt and other foreign matter because of the loss in velocity; and the air also changes direction, so as to flow axially instead of downwardly, thereby further tending to deposit all entrained dirt and other foreign matter. We believe that the principal advantage of our baffle 14 comes, however, from the fact that it prevents this dirt and other foreign matter from dropping directly onto the commutator 4.

From the foregoing description, and the illustration of our invention in a preferred form of embodiment, it will be perceived that we have provided a new air-intake means for use in railway motors, whereby we are able, with striking success, to solve the long-standing, difficult problem of satisfactorily providing for the copious ventilation of a railway motor.

While we have illustrated our invention in one preferred form of embodiment thereof, it will be obvious that many changes in the details of embodiment may be resorted to by those skilled in the art to meet particular conditions without departing from the essential spirit and scope of our invention. We desire, therefore, that the appended claims shall be accorded the broadest interpretation consistent with their language and the prior art.

We claim as our invention:

1. A railway motor having a stator member, a rotor member, said rotor member having a current-collecting mechanism at one end and a fan-member at the other end, an end housing for the stator member for enclosing the motor at the current-collecting end thereof, the top portion of the peripheral wall of said housing containing a group of perforations for providing a large number of substantially downwardly directed jets of incoming air drawn in by said fan-member, and a trough-like baffle disposed underneath said group of perforations and spaced therefrom for catching dirt and other foreign matter and preventing the same from falling onto the current-collecting mechanism, said baffle being highest at one point and inclined downwardly from said point, being joined to the sides of said peripheral wall of the housing at the lowest point or points of the baffle, said peripheral wall being provided with discharge-outlet means for said dirt and other foreign matter at or near said lowest point or points.

2. The invention as defined in claim 1, characterized by said group of perforations having a limited extent in an axial direction, and said baffle having a greater axial extent so as to catch the dirt and other foreign matter discharged by said air jets passing through said perforations, the axial extent of said baffle falling short of both the outer end-wall of the housing and the adjacent end portion of the internal parts of the stator, whereby the incoming air may flow axially in both directions over the two side-edges of the trough-like baffle.

3. A railway motor having a stator member, a rotor member, said rotor member having a current-collecting mechanism at one end, an end housing for the stator member for enclosing the motor at the current-collecting end thereof, the top portion of the peripheral wall of said housing containing a group of perforations, ventilating means for causing a large number of substantially downwardly directed jets of incoming air to be drawn in through said perforations, and a trough-like baffle disposed underneath said group of perforations and spaced therefrom for catching dirt and other foreign matter and preventing the same from falling onto the current-collecting mechanism, said baffle being highest at one point and inclined downwardly from said point, being joined to the sides of said peripheral wall of the housing at the lowest point or points of the baffle, said peripheral wall being provided with discharge-outlet means for said dirt and other foreign matter at or near said lowest point or points.

4. The invention as defined in claim 3, characterized by said group of perforations having a limited extent in an axial direction, and said baffle having a greater axial extent so as to catch the dirt and other foreign matter discharged by said air jets passing through said perforations, the axial extent of said baffle falling short of both the outer end-wall of the housing and the adjacent end portion of the internal parts of the stator, whereby the incoming air may flow axially in both directions over the two side-edges of the trough-like baffle.

5. An electric motor having a stator member, a rotor member, said rotor member having a current-collecting mechanism at one end and a fan-member at the other end, an end housing for the stator member for enclosing the motor at the current-collecting end thereof, the top portion of the peripheral wall of said housing containing an opening for providing access to the commutator end of the motor, a removable cover for said opening, said cover containing a group of perforations for providing a large number of substantially downwardly directed jets of incoming air drawn in by said fan-member, and a trough-like baffle disposed underneath said group of perforations and spaced therefrom for catching dirt and other foreign matter and preventing the same from falling onto the current-collecting mechanism, said baffle being highest at one point and inclined downwardly from said point, being joined to the sides of said cover at the lowest point or points of the baffle, said cover being provided with discharge-outlet means for said dirt and other foreign matter at or near said lowest point or points.

6. An electric motor having a stator member, a rotor member, said rotor member having a current-collecting mechanism at one end, an end housing for the stator member for enclosing the motor at the current-collecting end thereof, the top portion of the peripheral wall of said housing containing an opening for providing access to the commutator end of the motor, and a removable cover for said opening, said cover containing a group of perforations, ventilating means for causing a large number of substantially downwardly directed jets of incoming air to be drawn in through said perforations, and a trough-like baffle disposed underneath said group of perforations and spaced therefrom for catching dirt and other foreign matter and preventing the same from falling onto the current-collecting mechanism, said baffle being highest at one point and inclined downwardly from said point, being joined to the sides of said cover at the lowest point or points of the baffle, said cover being provided with discharge-outlet means for said dirt and other foreign matter at or near said lowest point or points.

CLARENCE A. ATWELL.
FRANK B. POWERS.